United States Patent
Shorter, Jr. et al.

(10) Patent No.: US 10,431,100 B2
(45) Date of Patent: Oct. 1, 2019

(54) INTERACTIVE AND CUSTOMIZABLE FLIGHT PLANNING TOOL

(71) Applicant: Aircraft Owners and Pilots Association, Frederick, MD (US)

(72) Inventors: Douglas Nolen Shorter, Jr., Leesburg, VA (US); John Dennis Hamilton, Frederick, MD (US); Kimberly Lynn Ocasek, Summerville, SC (US); Eric John Rush, Carlisle, PA (US); Brian Michael Tenberg, Manchester, MD (US); John Vance Whitehouse, Walkersville, MD (US); Sergey Krilov, Frederick, MD (US)

(73) Assignee: Aircraft Owners and Pilots Association, Frederick, MD (US)

( * ) Notice: Subject to any disclaimer, the term of this patent is extended or adjusted under 35 U.S.C. 154(b) by 386 days.

(21) Appl. No.: 14/929,211

(22) Filed: Oct. 30, 2015

(65) Prior Publication Data

US 2016/0125743 A1    May 5, 2016

Related U.S. Application Data

(60) Provisional application No. 62/137,327, filed on Mar. 24, 2015, provisional application No. 62/073,425, (Continued)

(51) Int. Cl.
*G08G 5/00* (2006.01)
*G06F 3/00* (2006.01)
(Continued)

(52) U.S. Cl.
CPC .............. *G08G 5/0034* (2013.01); *G06F 3/00* (2013.01); *G06F 9/451* (2018.02); *G06Q 10/10* (2013.01);
(Continued)

(58) Field of Classification Search
CPC ......... G06F 3/00; G06F 9/451; G08G 5/0013; G08G 5/0026; G08G 5/0034;
(Continued)

(56) References Cited

U.S. PATENT DOCUMENTS 5,566,073 A    10/1996  Margolin
5,874,905 A     2/1999  Nanba et al.
(Continued)

FOREIGN PATENT DOCUMENTS

WO    WO 01/27822 A1    4/2001

OTHER PUBLICATIONS

David Crossley et al., A Generic Map Interface to Query Geographic Information Using the World Wide Web, http://www.w3.org/Conferences/WWW4/Papers/australia/#15, Apr. 10, 2001.

*Primary Examiner* — Robert T Nguyen
(74) *Attorney, Agent, or Firm* — Finnegan, Henderson, Farabow, Garrett & Dunner LLP

(57) ABSTRACT

A flight planning system is disclosed for providing an interactive and customizable flight planning tool. The flight planning system may include a memory device for storing flight information and one or more hardware processors. The processors may receive, from a client device associated with the flight planning system, a first flight information request and provide, in response to the first flight information request, an interactive user interface having a graphical representation of a flight plan that includes at least a flight route. The processors may provide a plurality of selectable overlays that modify the appearance of the graphical representation and display additional information related to the flight information. The processors may receive a second request related to the flight information and provide a modified user interface comprising at least a feature related to the second request and the flight information.

23 Claims, 14 Drawing Sheets

Related U.S. Application Data filed on Oct. 31, 2014, provisional application No. 62/107,071, filed on Jan. 23, 2015.

(51) Int. Cl.
  *G06Q 10/10* (2012.01)
  *G06F 9/451* (2018.01)

(52) U.S. Cl.
  CPC ......... *G06Q 10/109* (2013.01); *G08G 5/0013* (2013.01); *G08G 5/0026* (2013.01); *G08G 5/0043* (2013.01); *G08G 5/0091* (2013.01)

(58) Field of Classification Search
  CPC .... G08G 5/0043; G08G 5/0091; G06Q 10/10; G06Q 10/109
  See application file for complete search history.

(56) References Cited

U.S. PATENT DOCUMENTS

| | | | |
|---|---|---|---|
| 5,944,769 A | 8/1999 | Musk et al. | |
| 6,005,581 A | 12/1999 | Gjullin | |
| 6,112,141 A | 8/2000 | Briffe et al. | |
| 6,134,500 A | 10/2000 | Tang et al. | |
| 6,240,341 B1 | 5/2001 | Snyder | |
| 6,353,794 B1 | 3/2002 | Davis et al. | |
| 6,388,688 B1 | 5/2002 | Schileru-Key | |
| 6,459,986 B1 | 10/2002 | Boyce et al. | |
| 6,675,092 B1 | 1/2004 | Katayama et al. | |
| 7,263,494 B1 | 8/2007 | Harris | |
| 7,555,725 B2 | 6/2009 | Abramson et al. | |
| 7,612,688 B1* | 11/2009 | Vigeant-Langlois | G01C 23/00 340/971 |
| 7,623,494 B2 | 11/2009 | Zhu et al. | |
| 7,640,098 B2 | 12/2009 | Stenbock et al. | |
| 8,447,512 B2 | 5/2013 | Stenbock et al. | |
| 8,918,271 B2* | 12/2014 | Pendry | G08G 5/0034 244/158.1 |
| 9,511,877 B2 | 12/2016 | Masson | |
| 9,810,770 B1* | 11/2017 | Weichbrod | G01S 13/953 |
| 9,849,999 B1* | 12/2017 | Fymat | B64D 45/00 |
| 2001/0027375 A1 | 10/2001 | Machida et al. | |
| 2002/0059296 A1 | 5/2002 | Hayashi et al. | |
| 2009/0150012 A1* | 6/2009 | Agam | G01C 23/005 701/3 |
| 2009/0291418 A1* | 11/2009 | Srivastav | G01C 21/00 434/43 |
| 2010/0152962 A1 | 6/2010 | Bennett et al. | |
| 2010/0280753 A1* | 11/2010 | Chytil | G01C 23/00 701/532 |
| 2011/0022294 A1* | 1/2011 | Apley | G01W 1/00 701/532 |
| 2011/0313597 A1* | 12/2011 | Wilson | G01C 23/00 701/3 |
| 2012/0010765 A1* | 1/2012 | Wilson | G01C 23/00 701/3 |
| 2012/0259669 A1 | 10/2012 | Stilwell et al. | |
| 2013/0013133 A1* | 1/2013 | Walter | G08G 5/0021 701/11 |
| 2013/0265425 A1 | 10/2013 | Smailus | |
| 2013/0345905 A1* | 12/2013 | Parthasarathy | G08G 5/0039 701/3 |
| 2014/0309821 A1* | 10/2014 | Poux | G08G 5/0021 701/14 |
| 2015/0169191 A1* | 6/2015 | Maji | G06F 3/04842 715/771 |
| 2015/0199906 A1* | 7/2015 | Judy | G08G 5/003 701/3 |
| 2015/0239574 A1* | 8/2015 | Ball | B64D 45/00 701/3 |
| 2015/0260525 A1* | 9/2015 | Parthasarathy | G01C 23/00 701/538 |
| 2015/0268048 A1* | 9/2015 | Seastrand | G01C 21/20 701/528 |
| 2016/0111007 A1* | 4/2016 | Dennerline | G08G 5/0034 701/528 |
| 2016/0180715 A1* | 6/2016 | Burke | G08G 5/0008 701/467 |
| 2017/0039765 A1* | 2/2017 | Zhou | G06T 19/006 |

* cited by examiner

600

| New Route | Stored Routes |

☐ Public Use Airports Only

Departure [_____]

Destination [_____]

Aircraft [_____ ▽]

Altitude [____ ⌃⌄]

Routing [____ ▽]

Flight Rules  ○ VFR  ○ IFR

Time [____ ⌃⌄]

610

( PLAN ROUTE )

*Fig. 6*

FAA WEATHER BRIEFINGS AND FLIGHT PLANS
| NEW BRIEFING | NEW FAA FLIGHT PLAN | RECENT BRIEFINGS | RECENT FLIGHT PLANS |

BRIEFING TYPE: ● ROUTE ○ AREA

FILL OUT THIS FORM TO SUBMIT AN OFFICIAL FAA WEATHER BRIEFING REQUEST THROUGH DUATS OR DUAT. AN ACCOUNT WITH EITHER PROVIDER WILL BE REQUIRED.

* TAIL #: [ ∨ ]

* EQUIPMENT: [ ]

* DEPARTURE: [JFK] (AIRPORT ID)    * ROUTE: [DIRECT]

* DEP TIME: [1806] (ZULU)    * DESTINATION: [KDYT] (AIRPORT ID)

* ALTITUDE: [3611] (FEET)    ALTERNATE: [ ] (AIRPORT ID)

* FLIGHT TIME: [ ]

ADVANCED
CORRIDORS:    OPTIONS:
* ROUTE: [20 ⇕] (NM)    ☑ PLAIN LANGUAGE    ☐ FDC NOTAMS    ☐ ATC DELAYS
* WINDS: [100 ⇕] (NM)    ☐ HURRICANE ADVISORIES    ☐ ADVERSE WEATHER

1210

( SUBMIT REQUEST )

FAA WEATHER BREIFINGS AND FLIGHT PLANS | NEW BRIEFING | NEW FAA FLIGHT PLAN | RECENT BRIEFINGS | RECENT FLIGHT PLANS

1300

* 1. TYPE: ○ VFR  ○ IFR
* 2. REGISTRATION: ☐
* 3a. AIRCRAFT MODEL: ☐
* 3b. EQUIPMENT: ☐
* 4. TRUE AIRSPEED: ☐ (KNOTS)
* 5. DEPARTURE: JFK  EDIT
* 6. DEPARTURE TIME: FEB 20 18.06 Z  EDIT
* 7. ALTITUDE: 3,611' MSL  EDIT
* 8. ROUTE: DIRECT  EDIT
* 9. DESTINATION: KDYT  EDIT

11. REMARKS: ☐

12. FUEL ON BOARD: ☐ (HHMM)

13. ALTERNATE(S): ☐

* 14a. PILOT NAME: ☐  EDIT
* 14b. PILOT ADDRESS: ☐  EDIT

* 14c. PHONE: ☐
* 14d. HOMEBASE: ☐
* 15. PERSONS ABOARD: ☐
* 16. AIRCRAFT COLOR: ☐

1310

PRINT FORM   SUBMIT

NAV LOG

PRINT: KNEEBOARD FULL-PAGE

FLIGHT PLANNER

↻ REFRESH

NAVIGATION LOG

ROUTE:
REPORT DATE:
DEPARTURE:
AIRCRAFT:
TAIL #:

FILED ROUTE

| WAYPOINTS / FIXES | MEA/(MORA) / FREQ | ROUTE / ALT | MC / MH | FUEL(lb) LEG REM | FUEL(lb) LEG | DIST(NM) LEG | DIST(NM) REM | GS(Kts) | ETE / TTE | ATE / ATA | WIND / OAT |
|---|---|---|---|---|---|---|---|---|---|---|---|
| JFK JOHN F KENNEDY INTL N40° 38.385' W73° 46.736' | | | | | | | | | | | |
| KDYT SKY HARBOR N46° 43.311' W92° 2.606' | (6500) | 611 | 307 | 0 | 0 | 870 | 870 | EST / ACT 0 | 00:00 | | |
| ROUTE TOTALS | | | | 0 | | | 870 | 0 | 00:00 | | |

INTERACTIVE AND CUSTOMIZABLE FLIGHT PLANNING TOOL

PRIORITY CLAIM

This application claims priority under 35 U.S.C. § 119 to U.S. Provisional Application No. 62/107,071, filed on Jan. 23, 2015, U.S. Provisional Application No. 62/137,327, filed on Mar. 24, 2015, and U.S. Provisional Application No. 62/073,425, filed on Oct. 31, 2014, each of which is expressly incorporated herein by reference in its entirety.

TECHNICAL FIELD

The disclosed embodiments generally relate to a flight planning tool, and more particularly, an interactive and customizable flight planning tool that provides a comprehensive tool for general aviation pilots to plan and execute a flight.

BACKGROUND

Modern flight planning has continued to evolve from early individual web-based applications that separately supplied a general aviation pilot with flight information, such as weather, aircraft performance information, airport directories, and fundamental route planning to more all-in-one-solutions. For example, mobile, in-cockpit Electronic Flight Bags (EFBs) provide some information relevant to a flight, such as real-time weather and traffic information via wireless access to remote devices. But while current systems like EFBs may provide mobile access to some available information, there is a need for a single, customized source for all critical and pertinent information necessary for a pilot to plan and execute a flight.

Further, since current systems do not provide all necessary information in a single location, there is a lack of customization abilities that would allow a pilot to consider particular information that may be pertinent to a particular flight. Therefore, there is also a need for a user-friendly interface that allows a user to customize the information that is used to plan a flight.

SUMMARY

The disclosed embodiments include a device or devices that are configured to provide an interactive and customizable flight planning tool, as well as computer-implemented methods performed by the device or devices.

In one aspect, the present disclosure is directed to a customizable and interactive flight planning tool. The flight planning tool may include a flight planning system for providing a flight planning tool. The flight planning system may include a memory device for storing flight information and one or more hardware processors. The one or more hardware processors may be configured to receive, from a client device associated with the flight planning system, a first flight information request and provide, in response to the first flight information request, an interactive user interface, on the client device, having a graphical representation of flight information, including at least a flight route. The one or more hardware processors may also be configured to provide a plurality of selectable overlays that modify the appearance of the graphical representation when selected, wherein the plurality of overlays display additional information related to the flight information. The one or more hardware processors may also be configured to receive a second request, from the client device, related to the flight information and provide, in response to the second request, a modified user interface, on the client device, comprising at least a feature related to the second request and the flight information.

In another aspect, the present disclosure is directed to a method of planning a flight. The method may include receiving, from a client device, a first flight information request and providing, in response to the first flight information request, an interactive user interface, on the client device, having a graphical representation of flight information, including at least a flight route. The method may further include providing a plurality of selectable overlays that modify the appearance of the graphical representation when selected, wherein the plurality of overlays display additional information related to the flight information. The method may further include receiving a second request, from the client device, related to the flight information and providing, in response to the second request, a modified user interface, on the client device, comprising at least a feature related to the second request and the flight information.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 5-14 are illustrations of exemplary user interfaces that may be displayed as part of a flight planning tool.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments pertain to a flight planning tool, which may be or be provided by a computing system and which may be accessed through the same or another computing system. The flight planning tool may include a variety of features that allow a user (e.g., a pilot) to plan a flight (e.g., a general aviation flight), including routing and mapping the flight in an interactive and customizable manner. In addition, the flight planning tool may include integration with local and third-party services and information, such as weather, airport information, routing tools, map information, community information, flight plan filings, navigation logs, and the like. The flight planning system may be accessed through a user interface that provides the flight planning tool in a user-friendly manner while allowing for many levels of customization and complex interaction.

Figure 1:
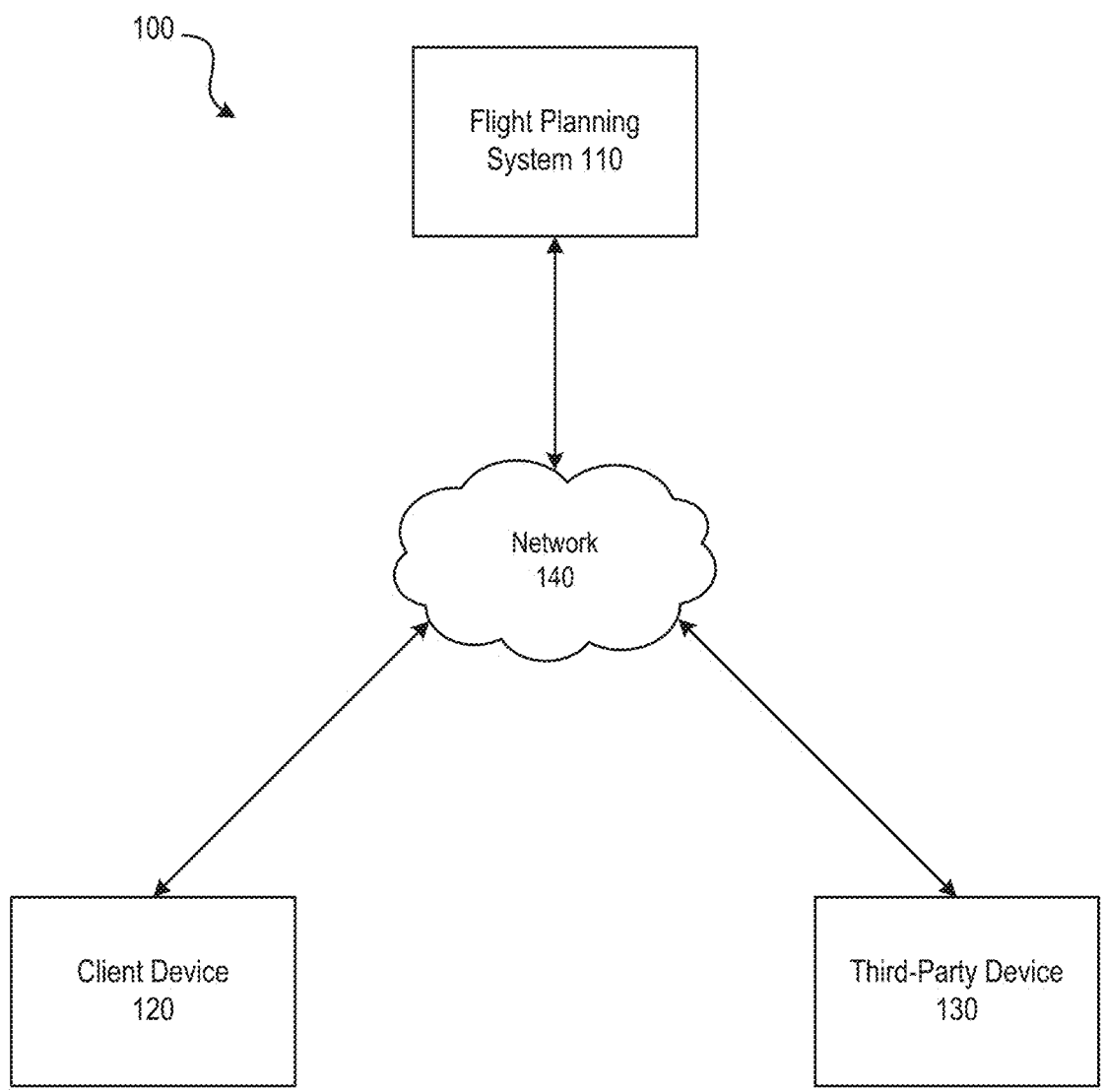
FIG. 1 is a block diagram of an exemplary system consistent with disclosed embodiments.

FIG. 1 is a diagram illustrating an exemplary system 100 for performing one or more operations consistent with the disclosed embodiments. In one embodiment, system 100 may include a flight planning system 110, a client device 120, a third-party device 130, and a network 140. The components and arrangement of the components included in the system 100 may vary. Thus, the system 100 may further include other components that perform or assist in the performance of one or more processes consistent with the disclosed embodiments.

Flight planning system 110 may include one or more computing systems that are configured to execute software instructions stored on one or more memory devices to perform one or more operations consistent with the disclosed embodiments. Flight planning system 110 may include one or more of a server, a computer, an embedded system, or a dedicated hardware device. In certain embodiments, flight planning system 110 may be configured as a particular apparatus, system, and the like based on the storage, execution, and/or implementation of the software instructions that perform one or more operations consistent with the disclosed embodiments.

In an exemplary embodiment, flight planning system 110 may include hardware and/or software components configured to create, store, and transmit a variety of flight planning tools. For example, flight planning system 110 may include hardware devices configured to gather information that may be useful to a pilot or individual associated with aviation. For instance, flight planning system 110 may include (or be configured to communicate with) devices that include weather data, airport data, aircraft data, pilot data, etc. Flight planning system 110 may collect this information and perform one or more processes to make it available to a user. For example, flight planning system 110 may be configured to provide the information to client device 120 and/or third party device 130.

Flight planning system 110 may provide the information via one or more flight planning tools, which may include a website and a mobile application, for example. Flight planning system 110 may be further configured to maintain information that is current, including information received through a provided flight planning tool. Flight planning system 110 may be configured to provide information received from one flight planning tool to another flight planning tool such that the flight planning tools are synchronized. Flight planning system 110 may be further configured to share information, such as flight routes, waypoints, temporary flight restrictions, and the like, between users such that a community of flight planning information is created.

Client device 120 may be one or more computing systems that are configured to execute software instructions for performing one or more operations consistent with the disclosed embodiments. In some embodiments, client device 120 may be one or more of a mobile device (e.g., a tablet, smartphone, etc.), a laptop, a desktop computer, a server, an embedded system, a dedicated hardware device, etc. Client device 120 may include one or more processors configured to execute software instructions stored in memory, such as memory included in client device 120. Client device 120 may include software that; when executed by a processor, performs known network-related communication and content display processes. For instance, client device 120 may execute browser software that generates and displays interface screens including content on interface hardware (e.g., a display device) included in, or connected to, client device 120.

In one embodiment, client device 120 may be a laptop or desktop computer configured to communicate with flight planning system 110 (e.g., via network 140). Client device 120 may be configured to execute software instructions to display an online flight planner generated by flight planning system 110. In one embodiment, the online flight planner may be a web-based application (e.g., website, applications, widget, etc.) through which client device 120 may provide information to a user (e.g., information collected by flight planning system 110) and request information from flight planning system 110 (e.g., generation of a flight plan).

In another embodiment, client device 120 may be a tablet or smartphone configured to store and/or execute one or more mobile applications ("apps"). For example, client device 120 may be configured to run a flight planning app, which may make flight planning system 110 accessible to a user (e.g., receive requests based on user input, display information received from flight planning system 10, etc.).

Third-party device 130 may be one or more computing systems associated with a third-party. Third-party device 130 may include one or more computing systems that are configured to execute software instructions for performing one or more operations consistent with the disclosed embodiments. For example, third-party device 130 may be a server, computer, laptop, mobile device (e.g., tablet, smartphone, etc.), an embedded system, a dedicated hardware device, etc. While one third-party device 130 is shown in FIG. 1, it should be understood that system 100 may include a plurality of third-party devices 130, each associated with the same or different third-parties.

In one aspect, third-party device 130 may be associated with a third-party that determines, collects, and/or stores information related to aviation. For example, third-party device 130 may be associated with a weather forecaster, an aircraft manufacturer, an airport, an aircraft, an aviation regulatory entity (e.g., FAA and the like), etc. In this way, flight planning system 110 may receive information through communication with a selected third-party device 130.

In another aspect, third-party device 130 may be associated with a third-party that provides information to a user through client device 120. For example, third-party device 130 may be associated with an entity that provides an aviation tool (e.g., a mobile app) that may be accessed by client device 120. In another example, third-party device 130 may be a flight planning engine that provides some aspect of a flight plan, such as calculating a flight route based on provided information (e.g., origination, destination, altitude, departure time, etc.). In yet another example, third-party device 130 may be unrelated to aviation, such as a social media platform. In some embodiments, flight planning system 110 may communicate with third-party device 130 to integrate information and resources to enhance the flight planning tools provided by the third-party.

In yet another aspect, one or more of flight planning system 110 and client device 120 may provide information to third-party device 130. For example, third-party device 130 may integrate flight planning data and/or services into a third-party system and/or service. For example, third-party device 130 may be a schedule organizer and may receive flight plan and other information to update a calendar. The calendar may include events associated with, for example, airports (e.g., scheduled closures, social events, fuel deliveries, etc.), aircrafts (e.g., scheduled maintenance, recurring flights, etc.), and/or associated personnel. In one aspect, the calendar may also include information that may be used to plan a full trip, such as hotel reservations, local attractions, entertainment, points of interest, and/or other information. Such information may be displayed on a calendar in a user interface, and the information may be displayed in coordination with received flight plant information (e.g., current location, destination location, current/future date and time, etc.). Other content from other third-party sources may be included, as desired.

In another example, third-party device 130 may be a social media platform configured to receive information from flight planning system 110 and/or client device 120, such as flight plans, pictures, schedules, locations, events, etc. Certain information may be automatically or conditionally submit the second request to the flight planning entity via the flight planning system based on the user inputs. (e.g., based on a user permission or preference, based on a category of information, etc.) sent to social media platforms, such as calendar events, notices of flight arrivals and/or departures (e.g., including time, date, location, etc.), flight plan details, and/or other information.

Network 140 may be any type of network configured to provide communications between components of system 100. For example, network 140 may be any type of network (including infrastructure) that provides communications, exchanges information, and/or facilitates the exchange of information, such as the Internet, a Local Area Network, Near Field Communication (NFC), WIFI, Bluetooth®, or other suitable connection(s) that enables the sending and receiving of information between the components of system 100. In other embodiments, one or more components of system 100 may communicate directly through a dedicated communication link(s) (not shown), such as a link between flight planning system 110 and client device 120.

Figure 2:
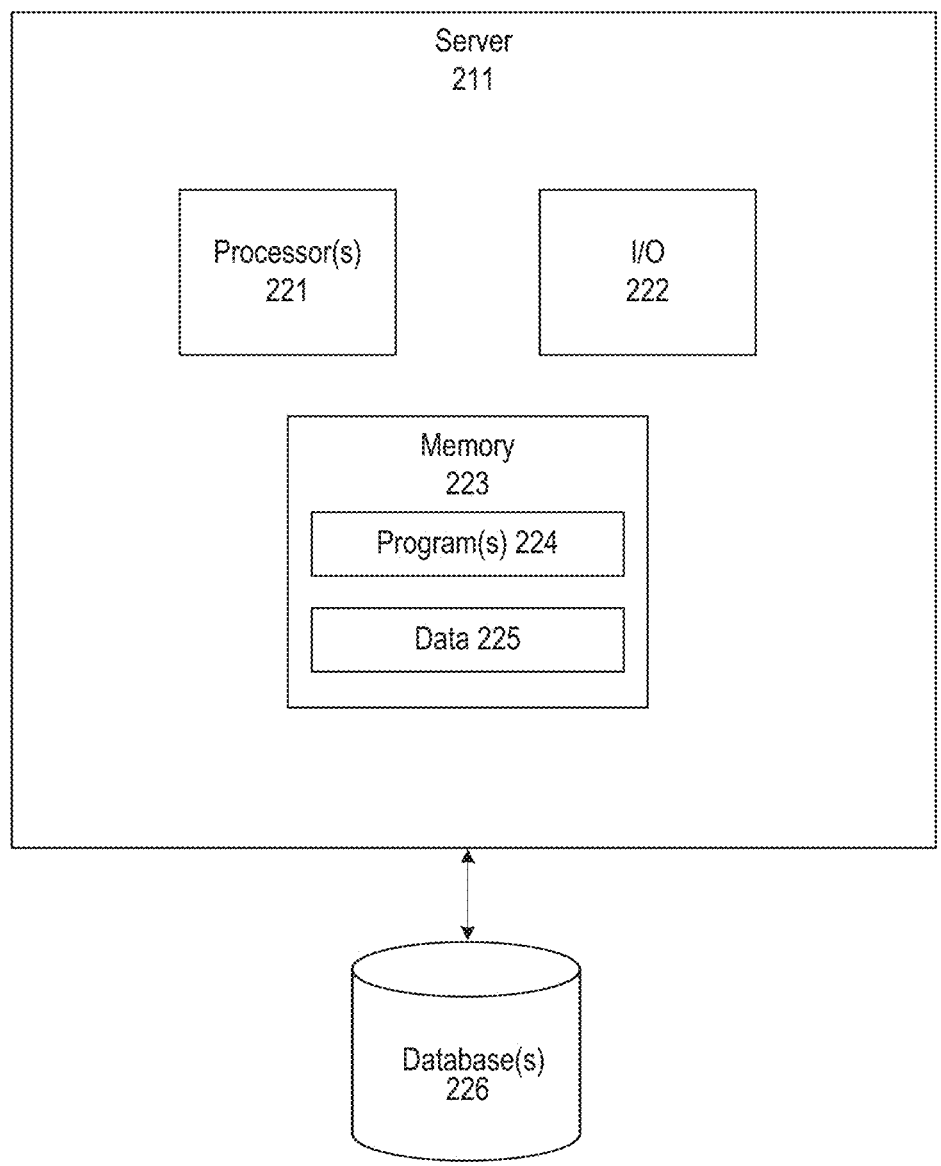
FIG. 2 is a block diagram of an exemplary server, consistent with disclosed embodiments.

FIG. 2 shows an exemplary server 211 for implementing embodiments consistent with the present disclosure. In an exemplary embodiment, server 211 may correspond to flight planning system 110. It should be understood, however, that variations of server 211 may correspond to client device 120, third-party device 130, and/or components thereof.

In one embodiment, server 211 may include one or more processors 221, one or more memories 223, and one or more input/output (I/O) devices 222. According to some embodiments, server 211 may be an embedded system or similar computing device(s) that generate, maintain, and provide web site(s) and/or mobile applications consistent with disclosed embodiments. Server 211 may be standalone, or it may be part of a subsystem, which may be part of a larger system. For example, server 211 may represent distributed servers that are remotely located and communicate over a network (e.g., network 140) or a dedicated network, such as a LAN.

Processor 221 may include one or more known processing devices, such as a microprocessor from the Pentium™ or Xeon™ family manufactured by InteL™, the Turion™ family manufactured by AMD™, or any of various processors manufactured by Sun Microsystems. The disclosed embodiments are not limited to any type of processor(s) configured in server 211.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, flight planning system 110, client device 120, and/or third-party device 130, may, via server 211, access one or more remote programs that, when executed, perform functions related to certain disclosed embodiments. Memory 223 may also store data 225 that may reflect any type of information in any format that the system may use to perform operations consistent with the disclosed embodiments.

I/O devices 222 may be one or more devices configured to allow data to be received and/or transmitted by server 211. I/O devices 222 may include one or more digital and/or analog communication devices that allow server 211 to communicate with other machines and devices, such as other components of system 100.

Server 211 may also be communicatively connected to one or more database(s) 226. Server 211 may be communicatively connected to database(s) 226 through network 140. Database 226 may include one or more memory devices that store information and are accessed and/or managed through server 211. By way of example, database(s) 226 may include MS SQL™, Oracle™ databases, Sybase™ databases, or other relational databases or non-relational databases, such as Hadoop sequence files, HBase™ or Cassandra™. The databases or other files may include, for example, data and information related to the source and destination of a network request, the data contained in the request, etc. Systems and methods of disclosed embodiments, however, are not limited to separate databases. In one aspect, system 200 may include database 226. Alternatively, database 226 may be located remotely from the system 200. Database 226 may include computing components (e.g., database management system, database server, etc.) configured to receive and process requests for data stored in memory devices of database(s) 226 and to provide data from database 226.

Figure 3:
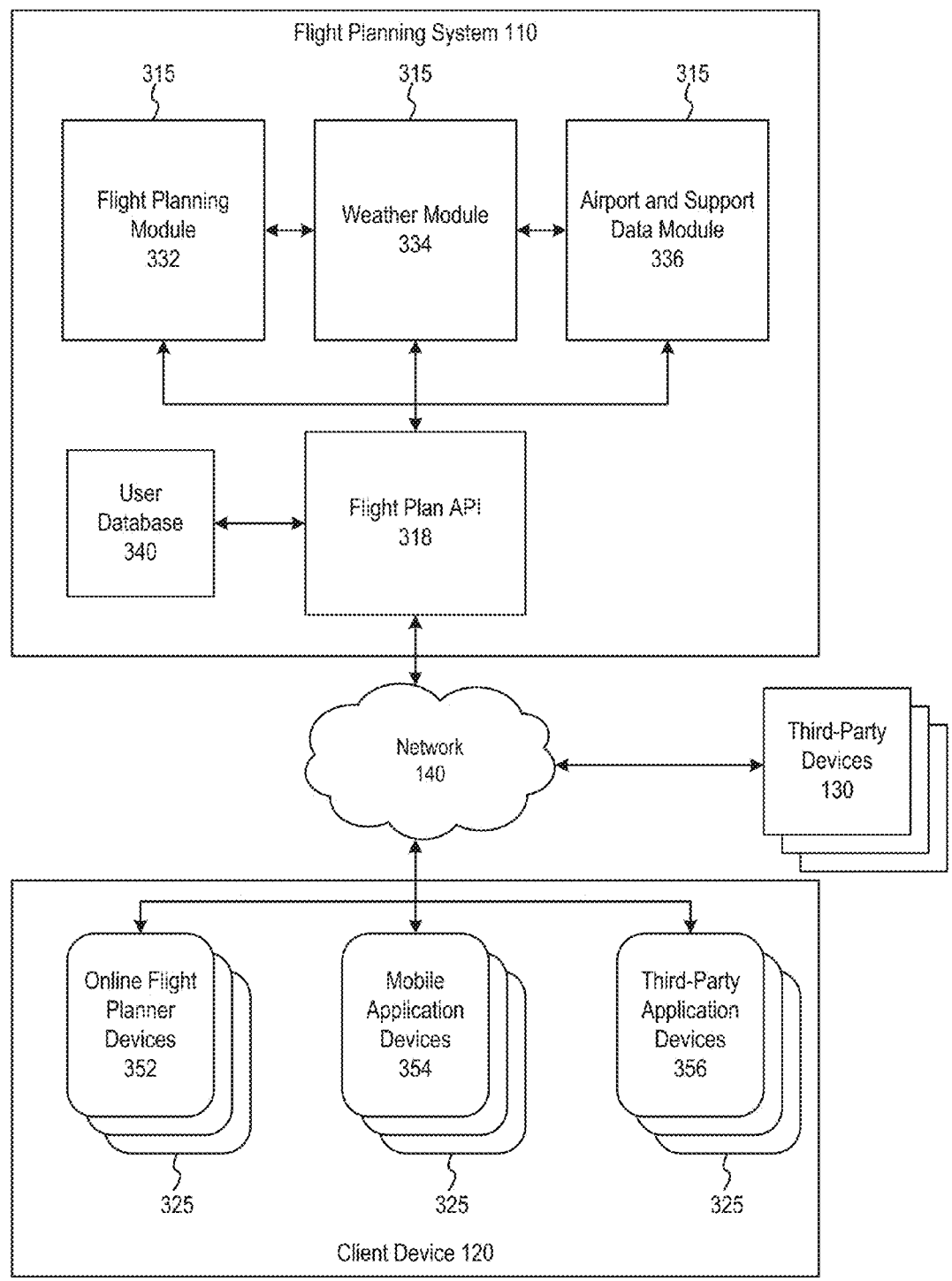
FIG. 3 is a block diagram of another exemplary system, consistent with disclosed embodiments.

FIG. 3 is a diagram illustrating an exemplary configuration of the components of system 100, including various additional components and features thereof. It should be understood that the configuration of system 100 depicted in FIG. 3 is exemplary, and that other configurations, including additional and/or alternative components and features are possible.

In an exemplary embodiment, flight planning system 110 may include features configured to generate a flight plan and/or provide the flight plan and/or aviation-related information to client device 120. For example, flight planning system 110 may include a plurality of modules 315 and a flight plan Application Program Interface (API) 318. Modules 315 may serve as data sources, configured to collect and store information, as well as to generate and store additional information and/or customized tools. Flight plan API 318 may be an exemplary interface through which flight planning system 110 may communicate with client device 120 and third-party device 130. While flight plan API 318 is depicted and described as one interface, it should be understood that flight plan API 318 my include a plurality of interfaces, such as an internal flight plan API for communicating with client device 120 (e.g., through a website or mobile application associated with flight planning system 110) and an external flight plan API for communicating with client device 120 (e.g., through a third-party website or mobile application) and/or third-party device 130.

As shown in FIG. 3, client device 120 may include or embody one or more of a plurality of client devices 325. Client devices 325 may include devices operated by users. The users may operate client devices 325 to cause client devices 325 to communicate with flight planning system 110 via flight plan API 318 and/or third-party device 130 (e.g., through network 140). Client devices 325 may receive information from flight planning system 110 and/or third-party device 130 and display it with associated interface hardware. Further client devices 325 may be configured to receive user input, and provide the user input information to flight planning system 110 and/or third-party device 130, such as to cause those devices to provide certain information back to client devices 325.

Third-party device 130 may be connected to network 140 such that third-party device 130 may communicate with flight plan API 318 and/or client devices 325. As shown in FIG. 3, third-party device 130 may include a plurality of third-party devices 130, which each may be associated with a different third-party entity, as described above.

In an exemplary embodiment, modules 315 may include at least a flight planning module 332, a weather module 334, and an airport and support data module 336. For the purposes of this disclosure, "modules" (also known as "engines") may be implemented in software, hardware, firmware, a mix of any of those, or the like. For example, if the disclosed "modules" are implemented in software, they may be stored in a memory associated with flight planning system 110. Processors, I/O devices, and memory devices may be utilized to perform processes to implement and facilitate operations of modules 315. Thus, modules 315 may include code instructions executable by one or more processors, alone or in various combinations with other modules disclosed in this or other embodiments. For example, flight planning module 332 may be configured to interact with weather module 334, and/or other modules of flight planning system 110, shown or not shown in FIG. 3, to perform functions consistent with disclosed embodiments. In other embodiments, if the disclosed "modules" are implemented in hardware, they may comprise an embedded system or other dedicated hardware configured by machine code, assembly code, or the like to interact with other modules of flight planning system 110 to perform functions consistent with disclosed embodiments.

Flight planning module 332 may be configured to generate a flight plan. For example, flight planning module 332 may be configured to execute software instructions to determine a route for a potential aviation flight. Flight planning module 332 may communicate with other modules 315 to collect information that may be used to calculate a flight route. Flight planning module 332 may also communicate with third-party devices 130 (e.g., via flight plan API 318) to collect information. For example, flight planning module 332 may communicate with a third-party flight planning engine that may calculate a flight route based on provided information. Flight planning module 332 may provide a generated flight plan to client device 120 for display and use by a user.

In some embodiments, flight planning module 332 may include various features configured to provide an interactive flight plan. For example, flight planning module 332 may include a flight planning engine, a routing engine, and a graphics engine. The routing engine may determine a route for the flight and the graphics engine may generate interactive charts and weather displays. The flight planning engine may combine the route and graphics to generate an interactive flight plan for a user.

Weather module 334 may be configured to track and store information related to weather that may affect aviation, such as by providing access to a collection of real-time, forecasted and predictive weather products. For example, weather module 334 may generate forecasts and predictions based on collected weather data or may receive completed forecasts and predictions. Weather module 334 may receive data and/or forecasts from third-party devices 130 (e.g., via flight plan API 318). For example, weather module 334 may access a weather forecast system such as Aircraft Owners and Pilots Association (AOPA) Weather or third-party providers. Weather module 334 may be configured to provide weather information to flight planning module 332 for use in generating a flight plan.

Airport and support data module 336 may be an additional module or modules configured to collect, generate, and/or store additional information that may be pertinent to aviation, such as information that may be used by flight planning module 332 to create a flight plan. For example, airport and support data module 336 may provide information related to airports, aircrafts, airlines, pilots, social media, news, aviation entities (e.g., FAA, AOPA, etc.), and the like. Airport and support data module 336 may connect to third-party devices 130 associated with this information (e.g., via flight plan API 318) to gather and store information that may be used by flight planning module 332 and/or provided to client device 120 and/or a third-party device 130.

Exemplary features of airport and support data module 336 may include flight planning resources such as an airport directory (e.g., through access to a full AOPA airports directory), weight and balance information, temporary flight restrictions, user-generated content, pilot and aircraft logbooks, manuals and instructions, calendars, etc. Further, while depicted and described with respect to airport and support data module 336, it should be understood that other components of flight planning system 110 may operate in addition to, alternative to, and/or in combination with airport and support data module 336 to provide these features.

In addition to modules 315, flight planning system 110 may include or be connected to at least one database 340. Database 340 may contain relevant pilot, aircraft, and/or flight planning information that may be used by one or more components of system 100, such as flight planning module 332. One or more of modules 315 and/or flight plan API 318 may be configured to retrieve information from database 340 for modules 315, client devices 325, and/or third-party devices 130. In an exemplary embodiment, database 340 may be an SQL database, but is not limited thereto.

In an exemplary embodiment, database 340 may be a user database configured to receive, store, and provide information associated with a community of aviation pilots and other users. For example, user database 340 may store user profiles associated with users of client devices 325. Each user profile may include information associated with the user, such as user login information, pilot information, aircraft information, saved flight routes, navigation logs, pictures, etc. In this way, user database 340 may serve as a repository for pertinent and non-pertinent information associated with flight planning. Information stored in user database 340 may be provided to client devices 325 through flight plan API 318.

Client devices 325 may include any client computing device configured to communicate with flight planning system 110 and/or a third party device 130. In an exemplary embodiment, client devices 325 may include online flight planner devices 352, mobile application devices 354, and third-party application devices 356. It should be understood that these representations of client devices 325 are made for convenience of discussion, and that they may overlap (i.e., a mobile application device 354 and a third-party application device 356 may be the same device).

Online flight planner devices 352 may be client devices 325 that are configured to communicate with flight planning system 110 to provide a web-based flight planning tool to a user. For example, online flight planner devices 352 may be laptop, desktop computer, notebook, tablet, smartphone, smartwatch, etc. configured to access a website (or other web-based application) provided by flight planning system 110. The website may provide access to a comprehensive flight planning tool provided by flight planning system 110.

Mobile application devices 354 may be client devices 325 that are configured to execute a mobile flight planning application. The mobile flight planning application may be a similar tool to the website accessible by online flight planner devices 352; however, it may be customized for use by a mobile device, including software that may be stored by mobile application devices 354. The mobile flight planning application may also provide access to a comprehensive flight planning tool provided by flight planning system 110.

Third-party application devices 356 may be client devices 325 that are similar to online-flight planner devices 352 and/or mobile application devices 354. For example, third-party application devices 356 may have web access and/or be configured to execute a mobile application. Regardless, third-party application device 356 may differ in that they connect to a third-party device 130 for receiving information through a website or mobile application. For example, third-party application devices 356 may include client devices 325 that store and execute a social media platform provided by a third-party device 130. In an exemplary embodiment, flight planning system 110 may be configured to communicate with the associated third-party device 130 such that flight planning information may be combined with the third-party application to provide an integrated service to a user through a third-party application device 356.

Figure 4:
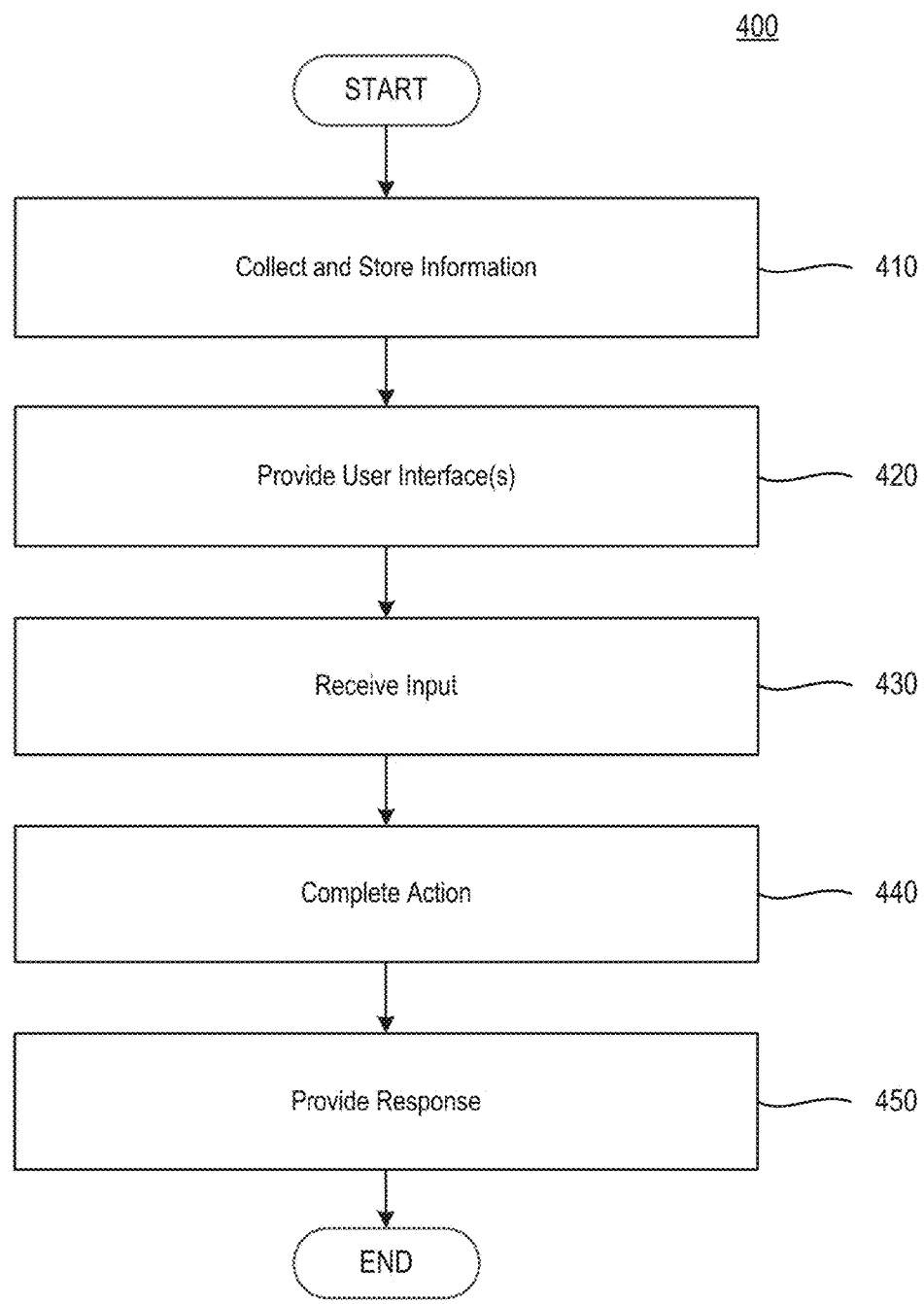
FIG. 4 is a flowchart of an exemplary flight planning process, consistent with disclosed embodiments.

FIG. 4 is a flowchart of an exemplary flight planning process 400 by which flight planning system 110 may provide a flight planning tool to a user. In one embodiment, flight planning system 110 may execute instructions stored in memory to perform process 400. It should be understood, however, that one or more client devices 325 and third-party devices 130 may execute instructions to perform one or more steps of process 400.

In step 410, flight planning system 110 may collect and store information. For example, flight planning system 110 may store information in database 340 or any of modules 315, such as user profiles, aircraft information, airport information, pilot information, and the like. Flight planning system 110 may also store information associated with flight routes that have already been created, either using a flight planning tool provided by flight planning system 110 or through other means and provided to flight planning system 110 as a flight route. Flight planning system 110 may also communicate with one or more client devices 325 and/or third-party devices 130 in order to receive information, such as weather information or other information capable of affecting flight parameters.

In step 420, flight planning system 110 may provide a user interface. In one example, flight planning system 110 may provide data to client device 120 for generation and display of the user interface. The user interface may provide information that is stored by flight planning system 110 and provided according to a particular stage of a flight planning process. For example, the user interface may include selectable options for planning a flight. The user interface may include visual representations of tools used to plan a flight, such as a graphical representation of an area (e.g., map, chart, and the like), a representation of a flight route on the graphical representation, various overlays for displaying various aspects in relation to the graphical representation (e.g., weather conditions, airport locations, waypoints, etc.), and the like. In some embodiments, the user interface may include a login interface that includes a prompt for a user to login to a flight planning tool provided by flight planning system 110.

In one embodiment, client device 120 may receive the user interface data from flight planning system 110 and display the user interface using interface hardware (e.g., a display screen). For example, client device 120 may be a computing device with access to network 140 (e.g., the Internet) and may provide a user interface in the form of a website through a web browser. In another example, client device 120 may be a computing device configured to run a mobile application that provides the user interface received from flight planning system 110. In another example, flight planning system 110 may include a computing device that includes interface hardware configured to display a user interface.

In some embodiments, flight planning system 110 (and/or client device 120) may provide an interactive user interface. For example, flight planning system 110 may provide a user interface that includes a graphical representation (e.g., map or chart), where the user interface is configured to allow a user to interact with the graphical representation by panning, zooming, etc., and/or by including custom features that pertain to a graphical representation such as Visual Flight Rules (VFR), Instrument Flight Rules (IFR), VFR/IFR hybrid features, various selectable map overlays, terrain maps, three-dimensional maps, etc.

In step 430, flight planning system 110 may receive input. For example, flight planning system 110 may receive input related to the user interface provided in step 420. In one embodiment, a user may enter information to client device 120, which client device 120 may send to flight planning system 110 as input. In another embodiment, a user may enter information directly to flight planning system 110, which flight planning system 110 may interpret as input.

Flight planning system 110 may receive input related to flight planning. For example, flight planning system 110 may receive information that identifies parameters of a flight route that is being planned by a user. Flight planning system 110 may also receive input related to other aspects of a flight planning tool. For example, flight planning system may receive input related to an ongoing flight (e.g., flight data), identifying information (e.g., identifying a pilot and/or an aircraft), input related to temporary flight restrictions, etc.

In step 440, flight planning system 110 may perform an action based on received input. For example, flight planning system 110 may execute instructions to perform a process to create a flight route based on parameters provided by a user. In another example, flight planning system 110 may retrieve stored information that is requested. For instance, flight planning system 110 may retrieve information related to a stored flight route, a user profile, airports, weather conditions, etc. In another example, flight planning system 110 may perform an action to communicate with another device, such as third-party device 130. For instance, flight planning system 110 may communicate with a third-party flight routing engine (e.g., a device that calculates a flight route based on provided parameters), a third-party weather system (e.g., to receive real-time weather information), a flight planning entity device (e.g., to file a flight plan with a flight planning entity, such as the FAA), a social media device, etc. In some embodiments, flight planning system 110 may store received input, e.g., in database 340, in step 440.

In step 450, flight planning system 110 may provide a response (e.g., to client device 120). For example, flight planning system 110 may provide requested information, such as a stored flight route in response to a request for a saved flight route. In another example, flight planning system 110 may provide information received from a third-party device 130, such as a calculated flight route, real-time weather information, confirmation of a flight filing, social media information, etc.

Flight planning system 110 may provide a response in the form of a modified user interface. The modified user interface may include displayed information or a feature that was not previously displayed. For example, flight planning system 110 may provide data to client device 120 for plotting a calculated flight route on a map, depicting weather on a map, displaying requested information (e.g., pictures, temporary flight restrictions, flight log information, etc.), and the like. In some embodiments, flight planning system 110 may provide temporary flight restriction (TFR) notifications and other notices to airmen (NOTAM) based on user-provided information and/or a calculated flight route (e.g., notification of a TFR that caused the flight route to take a certain path).

In one aspect, flight planning system 110 may be configured to generate NOTAMs based on flight planning information and/or in conjunction with user-provided information. For example, flight planning system may be configured to generate NOTAMs based on a current location, future location (e.g., based on logged flight plans), calendar events, future flight plans, and/or other ascertainable parameters. Custom NOTAMs may be generated based on user preferences that may be stored in connection with system 100 (e.g., in user database 340). For example, user preferences may include certain information to receive notifications about, certain times to receive notifications, certain geographic regions in which to receive notifications, and/or other preferences.

NOTAMs may also or alternatively be generated and displayed to the user automatically based on current and/or future submitted flight plan information. For example, a database of open notifications may be kept on or in connection with system 100 as notifications are generated (e.g., by agencies, by users, by airports, etc.). When a user's current or future flight plan parameters overlap parameters associated with a notice in the notification database, a NOTAM may be generated to notify the user of the relevant information. In another aspect, users may be allowed to search the notification database (e.g., using keyword searching, dropdown menus, chronologically, based on location, etc.) through flight planning system 110 or directly through a third-party source, to search or brows for particular notices or types of notices.

In another aspect, NOTAMs may be generated in conjunction with a flight safety calculator. For example, flight planning system may include or be connectable to (e.g., via a third-party device) a computational program configured to determine a safety rating based on certain flight plan information and other available information. In one aspect, the flight safety calculator may be configured to receive current and future weather information, ground condition information, user-provided information, and/or other information and generate a safety score based on such inputs. For example, weather information may include indicia of severity, location, altitude, and timing of unfavorable weather, which may be compared to flight plan information, such as flight path information, departure and arrival locations and timing, altitude, and/or other information. Based on the comparison, NOTAMs may be generated (e.g., official or unofficial), and communicated to client device 120 to alert the user of potential weather issues. The flight safety calculator may also receive inputs from third-party sources, such as FAA resources, the National Weather Service, other users, and/or other sources, which may be included as factors in the comparison and generation of NOTAMs.

Other features that may be provided as part of a response from flight planning system 110 (e.g., modified user interface) may include flight route wind optimization information, targeted advertising, items of interest along flight routes, fuel price optimized flight routing, customizable map and chart information, terrain maps, three-dimensional maps, side-view flight routes, and the like. Similarly, flight planning system 110 may provide a response to a third-party device 130, such as to post information to a social media platform, fill calendar information, etc.

Calendar information may be used to generate reminders. For example, a reminder may be created regarding a scheduled event at a desired time prior to the event. The reminder may be configured as a push notification or other type of visible reminder on client device 120. In this way, pertinent information may be brought to the user's attention as the events become relevant based on time, location, and/or other ascertainable variables.

One or more components of system 100 may perform one or more of the steps of 400 in order to provide a flight planning tool that includes a customizable and interactive user interface that may be a convenient flight planning tool for a user. Flight planning system 100 may receive, store, and generate data that may be used (e.g., by client device 120) to produce user interfaces that provide information (e.g., information related to flight planning). In addition, the components of system 100 may operate in conjunction to provide a variety of options to a user in such a way that renders the flight planning tool both comprehensive and easy-to-use. An exemplary flight planning tool consistent with the disclosed embodiments is illustrated in FIGS. 5-14 and further described below.

Figure 5:
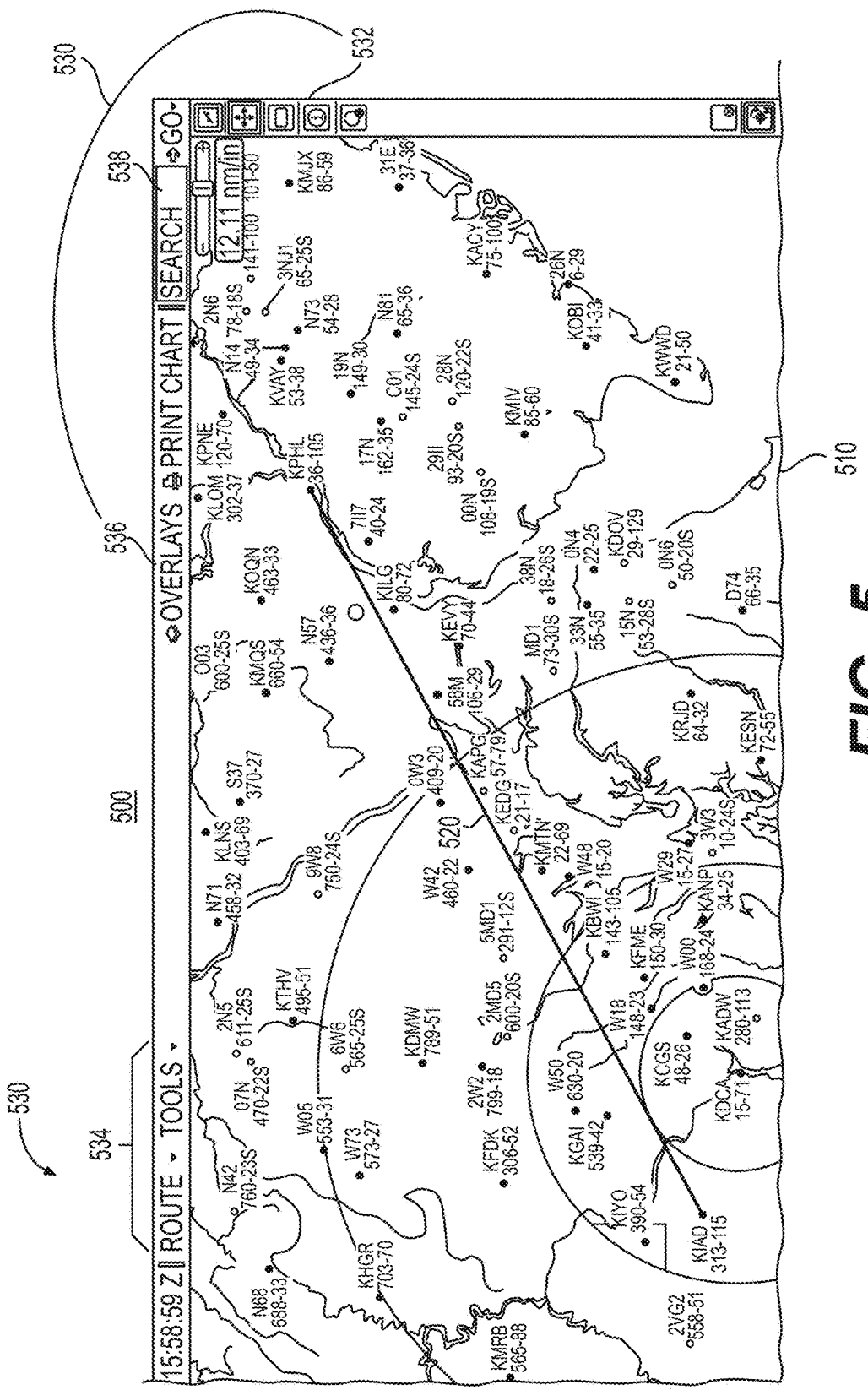

FIG. 5 is an exemplary user interface 500 associated with a flight planning tool provided by flight planning system 110. User interface 500, as with the other user interfaces depicted and described herein, may include information that is visually represented by interface hardware, such as interface hardware associated with flight planning system 110, client device 120, or third-party device 130.

User interface 500 depicts a map 510. Map 510 may include any of a variety of indicators, such as borders, geographical features, landmarks, distance markers, location identifiers, airports, etc., that allow the map to accurately depict or otherwise correspond to a particular region. It should be understood that map 510 may include any representation, such as any map or chart (e.g., represented graphically or textually) that identifies information related to an area within which a flight may take place.

User interface 500 may further include a flight route 520. Flight route 520 may be an estimation of a possible flight route that may be taken by an aircraft. For example, flight route 520 may include the path an aircraft may generally take in order to fly between two locations represented on map 510. While only the path is shown in FIG. 5, it should be understood that other information may be generated and provided in connection with flight route 520, such as speed, altitude, heading direction, and the like.

As shown in FIG. 5, user interface 500 may include various tools 530 that allow a user to interact with user interface 500 and perform one or more actions to plan a flight, for example. For instance, tools 530 may include map interaction features 532, selectable menu features 534, overlay features 536, and a search feature 538.

Map interaction features 532 may include selectable features that allow for interaction with map 510 (and or features of map 510). For example, map interaction features 532 may include features that allow the user to pan, zoom, scale, rotate, and/or flip the map 510. Map interaction features 532 may also be integrated into map 510 to allow a user to modify the displayed portion of the map by providing input (e.g., clicking, double clicking, dragging, etc.). It should be understood that map interaction features 532 may include any features that allow a user to modify the displayed map 510 such that a desired area is shown.

Selectable menu features 534 may include features that allow a user to navigate between user interfaces that provide one or more of a variety of flight planning tools. For example, selectable menu features 534 may include features that allow for the input of information associated with a new flight route, stored flight routes, filing of a flight route with a flight planning entity (e.g., the FAA), saving a current route, modifying a current route, map types, aviation alerts (e.g., temporary flight restrictions), user profiles, pilots, aircrafts, custom waypoints, and/or links to third-party information (e.g., weather and/or airport databases).

FIG. 6 depicts an exemplary user interface 600 that may be displayed after a selectable menu feature 534 related to creating a new flight route is selected. User interface 600 includes prompts 610 for a user to provide information related to a flight that the user is planning. For example, prompts 610 may include a departure location, destination location, aircraft selection, altitude selection, routing type selection, flight rule selection, and timing selection. The departure and destination selection may be selected from a list of airports, for example, which may be narrowed by a filter (e.g., to public use airports only). The aircraft selection may include a list of saved aircraft profiles (e.g., aircraft profiles previously input by a user and saved by flight planning system 110). The altitude, routing type, and flight rule selections may allow a user to specify criteria about the flight (e.g., the altitude at which the aircraft will generally fly, whether the flight is to be routed directly, through a low airway, or a high airway, and whether Visual Flight Rules (VFR) or Instrument Flight Rules (IFR) will be used). The time selection may allow a user to select a time at which the flight will take place (e.g., estimated departure).

Input information may be transmitted to a component of flight planning system 110 (e.g., flight planning module 332), which may use the information to generate a flight route. Alternatively, flight planning system 110 may communicate with a third-party device 130 to generate a flight route. Flight planning system 110 may provide the generated flight route to interface hardware (e.g., interface hardware associated with client device 120) for display as part of a user interface (e.g., user interface 500 with flight route 520).

Figure 7:
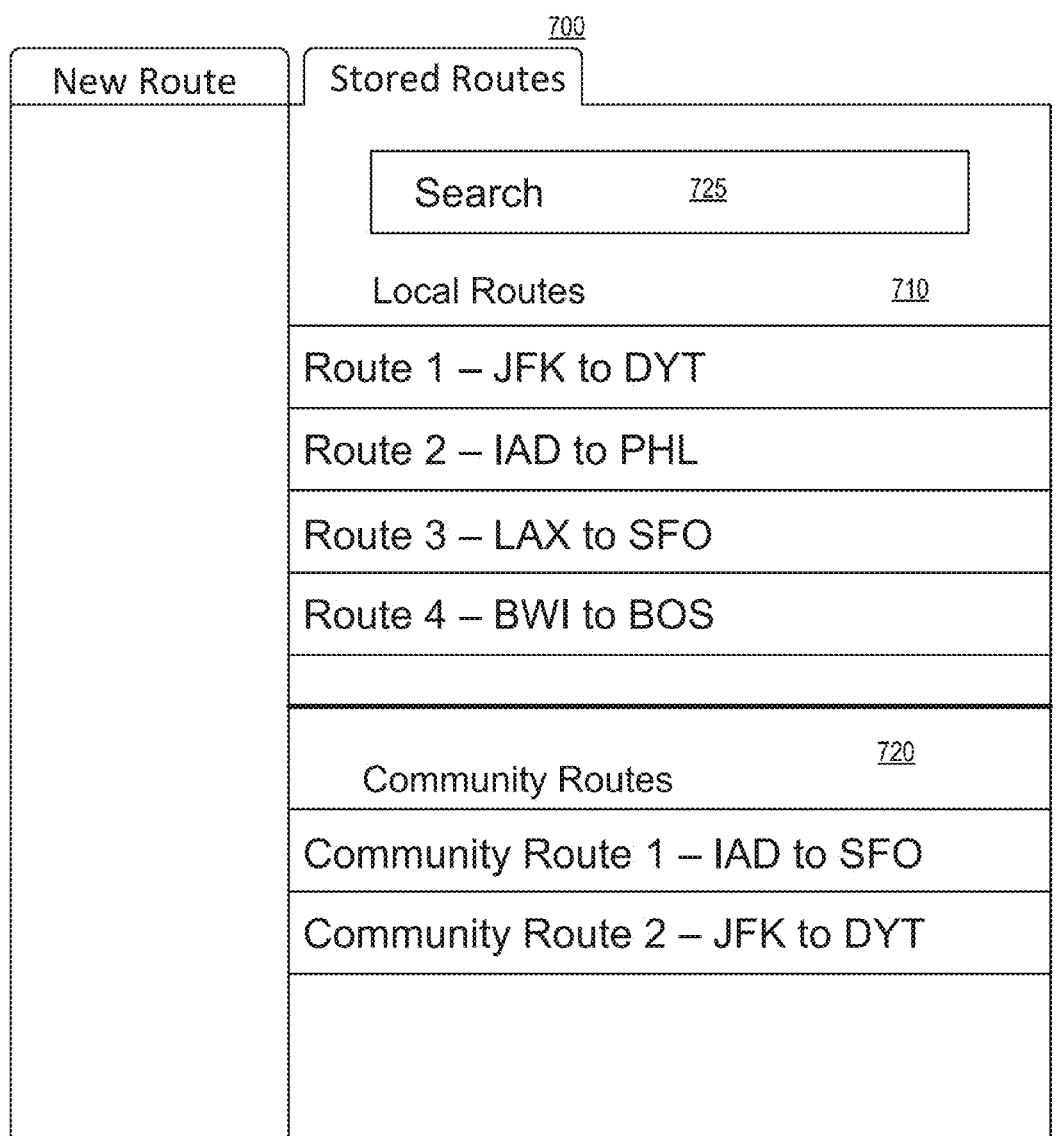

FIG. 7 depicts an exemplary user interface 700 that may be displayed after a selectable menu feature 534 related to retrieving a stored flight route is selected. For example, user interface 700 may include local routes 710 and community routes 720. Local routes 710 may include routes that were created by a current user and are stored in relation to an associated user profile. For example, a pilot may plan a plurality of flights over time, which each may be stored and available when that pilot accesses flight planning system 110.

Community routes 720 may include one or more routes that may be been planned through input from another user (e.g., a user besides a current user of the flight planning tool) and are made available through flight planning system 110. For example, a user-created flight route may be stored in database 340 and made available to certain users besides the user that caused the flight route to be created. In this way, flight routes may be shared between users.

A search feature 725 may be included to allow a user to search through local routes 710 and/or shared community routes 720. For example, flight planning system 110 may receive a search query as input through search feature 725. Flight planning system 110 may search database 340 for matching flight routes, and may provide results through user interface 700.

In some embodiments, flight planning system 110 may provide a flight planning tool that allows generated flight routes to be modified. For example, a user, through user interface 500, may modify flight route 520 in a variety of manners. In one example, a user may provide input for creation of a user-defined waypoint (depicted in FIG. 9), which flight planning system 110 may use to re-route flight route 520 (e.g., through the user-defined waypoint). In one example, user interface 500 may be configured to receive an input from the user (e.g., via client device 120) indicative of the user-defined waypoint. User interface 500 may be configured to receive coordinate information (e.g., latitudinal and longitudinal coordinates) of the waypoint. In another example, user interface 500 may be configured to receive a waypoint location selection on a map of route 250 shown on user interface 500. For instance, user interface 500 may be configured to allow the user to select, via an appropriate input device (e.g., a graphical pointer, touchscreen, etc.), a location on a map displayed on user interface 500 in order to add a waypoint to flight route 520 at the selected location. In another example, the user may provide input (e.g., via a graphical pointer or touchscreen interface) by dragging a portion of flight route 520 to another location on the map so as to modify the path shown by flight route 520 on the map (e.g., "rubber-banding").

Figure 8:
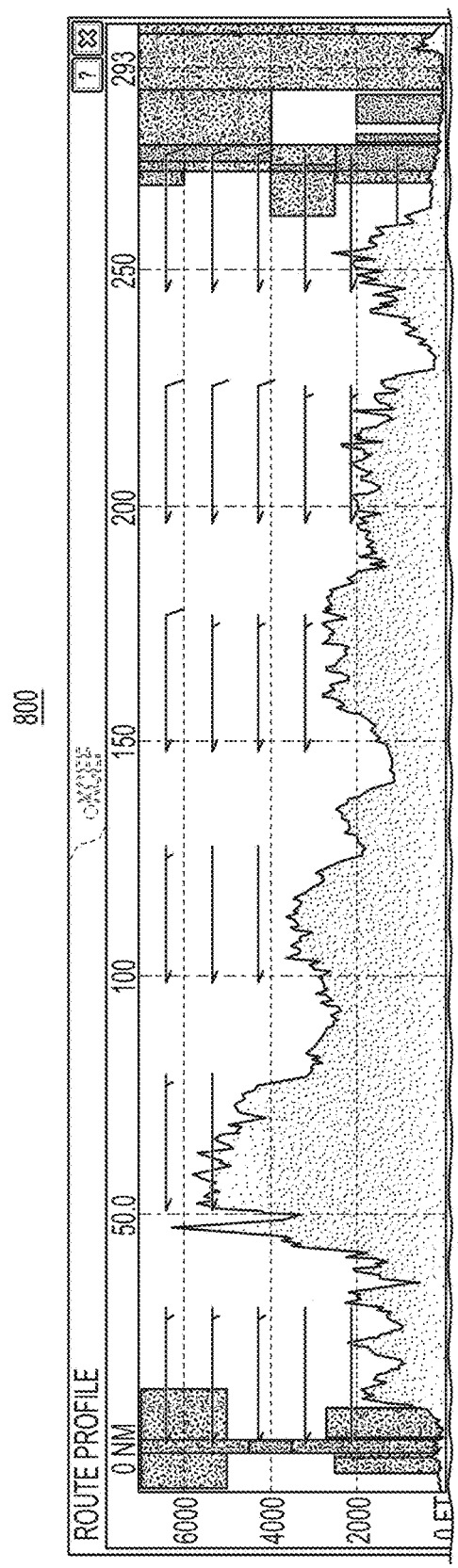

In some embodiments, flight planning system 110 may provide a flight planning tool that allows for different representations of a flight route and/or other information. For example, FIG. 8 depicts an exemplary user interface 800 that includes a route profile view that depicts, for example, terrain, airspace, forecast winds, etc. along the flight path in a side-view. The profile view may be a side perspective view. That is, the profile view may be a graphical representation configured to allow a user to visualize a route or a portion of a route in terms of distance, time, geographic position, altitude, or any combinations thereof. User interface 800 may include, for example, a graphical representation of route information configured to allow the user to visualize changes in the information with respect to time, distance, position, or another flight metric. Other options may include a three-dimensional visual representation of a flight route and/or a visual flight simulation.

Returning to FIG. 5, overlay features 536 may include selectable features that allow for customized information to be presented with respect to map 510. For example, overlay features 536 may include a menu that allows a user to select one or more categories of information that may be overlaid on map 510 such that a customized map 510 may be presented. The overlay features 536 may be related to aviation and include, for example, categories associated with routing (e.g., low airway markers, high airway markers, very high frequency omnidirectional radio range (VOR) stations, non-directional beacons (NDBs), en route airspace fixes, airspace fix labels, terminal airspace fixes, user-defined waypoints, etc.), airspace and obstacles (e.g., obstacle markers, obstacle labels, terminal airspace markers, special use airspace markers, special use airspace labels, bounds and boundaries, etc.), ground references (e.g., roads, railroads, urban areas, localizers, etc.), map components (borders, coastlines, latitude and longitude coordinates and grid, etc.), weather (e.g., radar, precipitation, echo, lighting, winds, weather stations, etc.), and airports (e.g., airports along route, low-use airport markers, low-use airport labels, etc.). It should be understood that these overlay features 536 are exemplary and may include additional or alternative categories and/or options. For example, flight route 520 itself may be an overlay feature 536.

Figure 9:
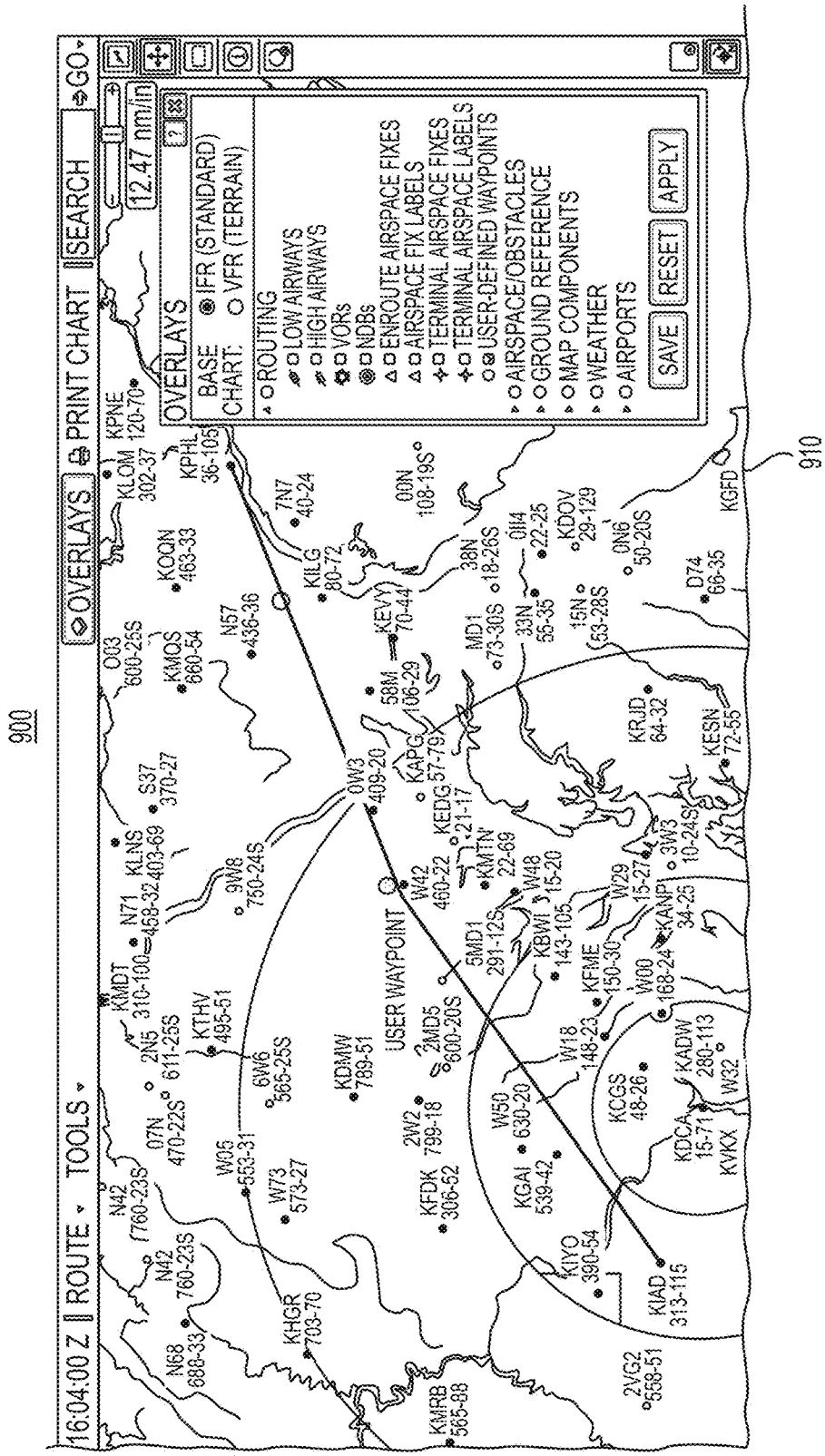

FIG. 9 depicts an exemplary user interface 900 that depicts some of the options associated with overlay features 536. For example, user interface 900 may include map 910 which includes an airport locations overlay, which depicts airport markers with labels throughout map 910. An exemplary user-defined waypoint overlay feature 536 is also shown in FIG. 9.

Figure 10:
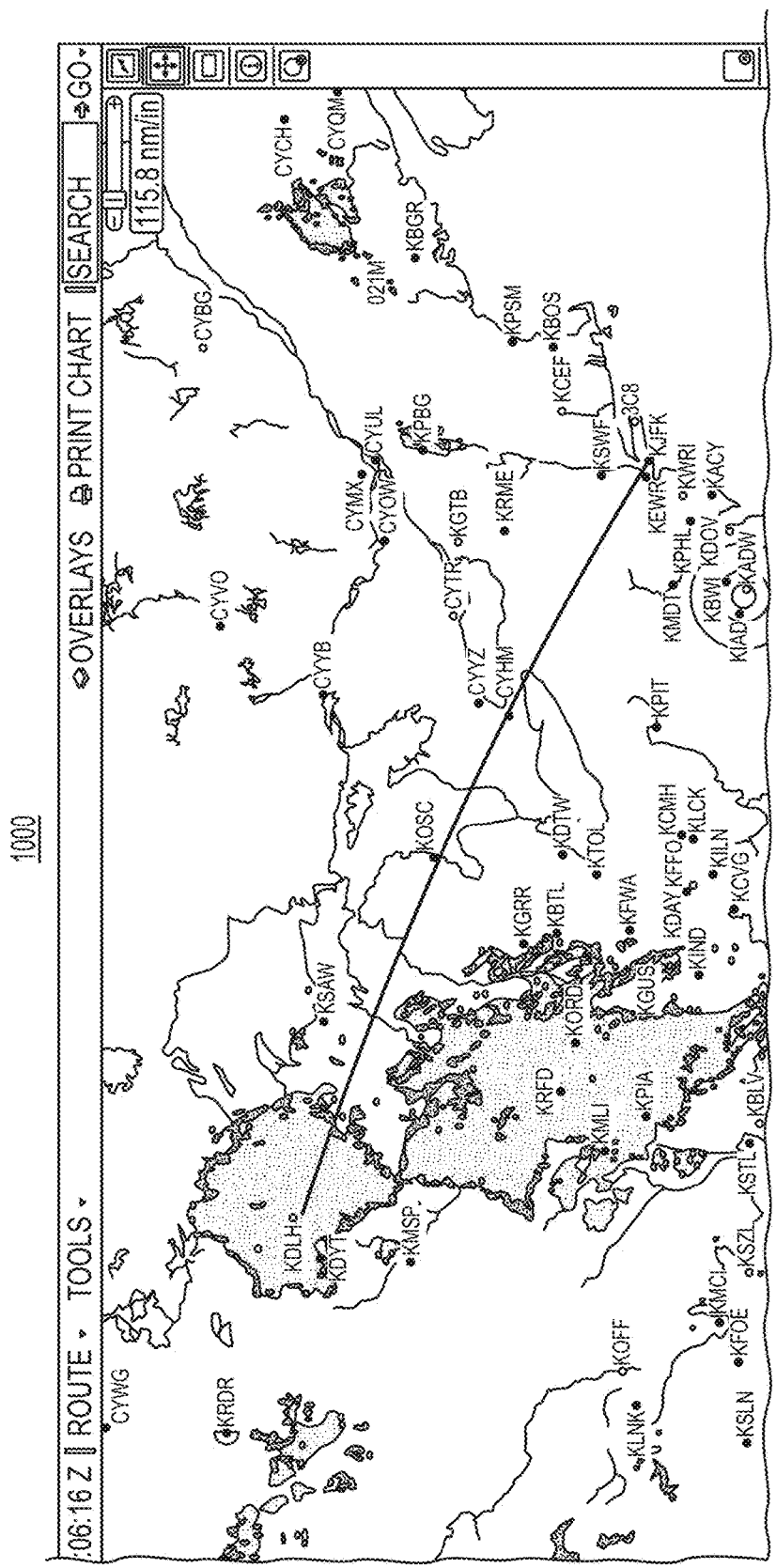

FIG. 10 depicts an exemplary user interface 1000 that includes a weather conditions overlay. The weather conditions overlay may provide weather information in a graphical manner. The weather overlay may include a variety of weather-related display options, and may include real-time current weather, forecasted future weather, weather histories, and may be represented textually and/or graphically.

Returning to FIG. 5, search feature 538 may be a search bar that may allow a user to enter an alphanumeric search query. Flight planning system 110 may receive the search query and provide a response. The search feature 538 may allow a user to search for any information associated with the flight planning tool, such as a map location, weather information, route information, etc. In some embodiments, map 510 may be interactive in other ways to provide search feature 538. For example, in some embodiments, user interface 500 may be interactive such that a user may select a portion of map 510 and flight planning system 110 may return search results based on a location associated with the selection. For example, a user may provide input to select a portion of the map that corresponds to an airport.

Figure 11:
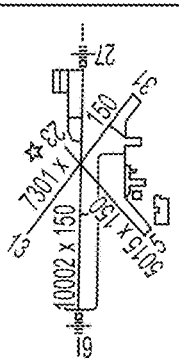

FIG. 11 depicts an exemplary user interface 1100 that includes an exemplary search result associated with an airport. For example, a user may search for the airport (e.g., by entering a search query or selecting the airport on map 510), which may cause flight planning system 110 to provide user interface 1100. As shown in FIG. 11, user interface 1100 may include a variety of information related to the selected airport, which the user may use in planning a flight, for example.

Using the above-described exemplary features, flight planning system 110 provides a flight planning tool for a user to plan an aviation flight, including a flight route for an aircraft to take. Flight planning system 110 may provide additional features, such as features that allow a pilot to execute the planned flight.

FIGS. 12 and 13 depict exemplary user interfaces 1200 and 1300, respectively, which include flight planning features associated with executing a flight. For example, user interface 1200 may include a plurality of prompts 1210 configured to receive user inputs indicative of information associated with a flight plan. In this way, information received by prompts 1210 may be submitted to flight planning system 110 via user interface 1200 to request a weather briefing for a future or current flight. Prompts 1210 on user interface 1200 may provide space for users to input, for example, a requested brief type (e.g., for a route, for an area, etc.), an aircraft identification, equipment type, departure and arrival information (e.g., location, date, time, etc.), types of additional weather notifications to receive, etc. User interface 1200 may also include a button or other user form configured to submit the request to flight planning system 110 when selected. In response to the submission, flight planning system may return a response (e.g., a weather brief) to client device 120.

In another example, user interface 1300 includes a plurality of prompts 1310 configured to receive user inputs indicative of information associated with a flight plan and flight planning system 110. Inputs received by prompts 1310 may be transmitted to flight planning system 110 and submitted to a flight planning agency (e.g., the FAA) to generate a flight plan. Prompts 1310 may provide space for users to input, for example, a desired flight rule selection (e.g., IFR or VFR), a type of aircraft and associated equipment, airspeed information, an amount of fuel onboard, pilot personal and contact information, a number of people onboard, aircraft identifying information, and/or other information. User interface 1300 may also include a button or other user form configured to submit the request to flight planning system 110 when selected. In this way, a flight plan may move towards takeoff while taking into account proper protocol (e.g., briefings, filings, etc.) before doing so.

Flight planning system 110 may additionally or alternatively provide features similar to those described with respect to FIGS. 12 and 13. For example, flight planning system 110 may provide recent briefings (e.g., a list of saved briefings for a client device 120 to access), recent flight plans (e.g., a list of saved flight plans that were filed with a flight planning entity), and the like.

FIG. 14 depicts an exemplary user interface 1400, which includes a navigation log that may be generated by flight planning system 110. For example, flight planning system 110 may generate a navigation log that corresponds to a flight and populate the navigation log before, during, and/or after the flight. The navigation log may include departure and destination information (e.g., location, date, time, etc.), waypoint information (e.g., name, location, etc.), fuel information, weather information, and or other information associate with the flight. Flight planning system 110 may save the navigation log, which may also include detailed information such as frequencies, heading, winds, etc. Flight planning system 110 may also provide the navigation log in a convenient manner, such as by allowing the navigation log to be presented and/or printed in a kneeboard or full-page layout.

The exemplary disclosed embodiments provide a flight planning tool that includes a comprehensive, easy-to-use, and interactive set of user interfaces that a flight planning system may provide to a user for use in planning an aviation flight. The user interfaces may provide crisp and clear images that are generated at the request of a user and include a variety of customization features, including map interaction features and overlay features.

In addition, a disclosed flight planning system may include both storage of information and a capability to connect to other resources of information. For example, the flight planning system may store community information related to flights, thus allowing for sharing of information between users and synchronization of data for the same user between different devices and programs. In addition, the flight planning system may connect to third-party systems to thus allow for a comprehensive and integrated approach to flight planning, such as by providing interactive aviation weather information in local, regional, and national scope as desired by a user and/or filing a flight plan with a flight planning entity. These and other features allow for a user to efficiently and safely plan and execute a flight.

Computer programs created on the basis of the written description and methods of this specification are within the skill of a software developer. The various programs or program modules can be created using a variety of programming techniques. For example, program sections or program modules can be designed in or by means of Java, Objective C, C++, Java script, assembly language, or any such programming languages, including third-party libraries. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A method of planning a flight, comprising:
   receiving, from a client device, a first flight information request;
   providing, in response to the first flight information request, an interactive user interface for display on the client device having a first graphical representation of flight information, including at least a flight route displayed on a map;
   providing, on the first graphical representation, a first selectable feature that, when selected, causes a plurality of selectable overlay options to be displayed on the first graphical interface,
      the plurality of overlay options corresponding to additional information related to the flight information, and
      the selectable overlay options causing an overlay feature with the additional information to appear on the map of the first graphical representation when selected;
   receiving a second request, from the client device, related to the flight information and indicative of a selection of one of the overlay options;
   providing, in response to the second request, a modified user interface for display on the client device comprising at least an overlay feature disposed over the map and corresponding to the selected overlay option indicated by the second request;
   providing, on the interactive user interface, a second selectable feature that, when selected, causes a plurality of interface options to be displayed on the first graphical representation,
   receiving a third request, from the client device, indicative of a selection of one of the interface options; and
   providing, in response to the third request, a modified user interface for display on the client device comprising at least an overlay interface disposed over the map and corresponding to the selected interface option indicated by the third request, the overlay interface comprising a plurality of input fields configured to receive flight plan information from the client device for generating a flight plan.

2. The method of claim 1, further including:
   receiving user input, from the client device, indicative of one or more parameters of the flight information;
   providing the user input to a flight planning engine; and
   receiving the flight route from the flight planning engine.

3. The method of claim 1, wherein
   the method further includes displaying, on the client device, one or more selectable saved flight plans; and
   receiving, from the client device, a selection of one of the one or more saved flight plans.

4. The method of claim 1, wherein:
   the interactive user interface includes selectable features on the graphical representation; and
   the method further includes:
      receiving an input indicative of a selected one of the selectable features; and
      providing a search result containing information based on the selected feature.

5. The method of claim 4, wherein:
   the selected feature is an airport on the map; and
   providing the search result includes displaying one or more details associated with the airport.

6. The method of claim 1, wherein providing the plurality of selectable overlay options includes displaying an option corresponding to information related to one or more of past, current, or future weather conditions.

7. The method of claim 1, wherein receiving the second request includes receiving a request to modify the flight route.

8. The method of claim 7, wherein receiving the request to modify the flight route includes receiving a user input indicative of a user-defined waypoint through which the flight route is to pass.

9. The method of claim 1, further including displaying a side perspective view of the route on the modified user interface in response to the second request, wherein the side perspective view of the route includes a graphical representation of flight plan information along the route.

10. The method of claim 1, wherein:
    the third request includes a request to retrieve a weather briefing with a flight planning entity; and
    the method further includes
       receiving user to inputs indicative of information associated with the weather briefing; and
       submitting the third request to the flight planning entity based on the user inputs.

11. The method of claim 1, wherein the method further includes:
    submitting flight plan information received by the plurality of input fields to a flight planning entity; and
    displaying, on the client device, information received from the flight planning entity in response to the submission.

12. A flight planning system for providing a flight planning tool, comprising:
    a memory device for storing flight information; and
    one or more hardware processors configured to:
       receive, from a client device associated with the flight planning system, a first request;
       provide, in response to the first request, an interactive user interface for display on the client device having a first graphical representation of flight information, including at least a flight route displayed on a map;

provide, on the interactive user interface, a first selectable feature that, when selected, causes a plurality of selectable overlay options to be displayed on the first graphical representation,
the plurality of overlay options corresponding to additional information related to the flight information; and
the selectable overlay options causing an overlay feature with the additional information to appear on the map of the first graphical representation when selected;
receive a second request, from the client device, related to the flight information and indicative of a selection of one of the overlay options;
provide, in response to the second request, a modified user interface for display on the client device comprising at least an overlay feature disposed over the map and corresponding to the selected overlay option indicated by the second request;
provide, on the interactive user interface, a second selectable feature that, when selected, causes a plurality of interface options to be displayed on the first graphical representation,
receive a third request, from the client device, indicative of a selection of one of the interface options; and
provide, in response to the third request, a modified user interface for display on the client device comprising at least an overlay interface disposed over the map and corresponding to the selected interface option indicated by the third request, the overlay interface comprising a plurality of input fields configured to receive flight plan information from the client device for generating a flight plan.

13. The flight planning system of claim 12, wherein the first request includes user input, received from the client device, indicative of one or more parameters of the flight information.

14. The flight planning system of claim 13, wherein the one or more hardware processors are further configured to provide the user input to a flight planning engine and, in response to providing the user input to the flight planning engine, receive the flight route from the flight planning engine.

15. The flight planning system of claim 12, wherein: the one or more hardware processors are configured to provide information to be displayed on the client device including one or more selectable saved flight plans; and the first request includes a selection of one of the one or more saved flight plans.

16. The flight planning system of claim 12, wherein:
the interactive user interface includes selectable features on the graphical representation; and
the one or more hardware processors are further configured to:
receive an input indicative of a selected one of the selectable features; and
provide a search result containing information based on the selected feature.

17. The flight planning system of claim 16, wherein:
the selected feature is an airport on the map; and
the search result includes one or more details associated with the airport.

18. The flight planning system of claim 12, wherein the plurality of overlay options include an option corresponding to a weather conditions overlay configured to display one or more of past, current, or future weather conditions information.

19. The flight planning system of claim 12, wherein the second request includes a request to modify the flight information.

20. The flight planning system of claim 19, wherein:
the request to modify the flight information includes a user-defined waypoint through which the flight route is to pass; and
the interactive user interface is configured to receive a user input on the map via input hardware indicative of the user-defined waypoint.

21. The flight planning system of claim 12, wherein the one or more hardware processors are configured to display a side perspective view of the route on the modified user interface in response to the second request, the side perspective view of the route including a graphical representation of flight plan information along the route.

22. The flight planning system of claim 12, wherein:
the third request includes a request to retrieve a weather briefing with a flight planning entity; and
the one or more hardware processors are configured to:
display, on the modified user interface, one or more prompts configured to receive user inputs indicative of information associated with the weather briefing; and
submit the third request to the flight planning entity via the flight planning system based on the user inputs.

23. The flight planning system of claim 12, wherein:
the one or more hardware processors are configured to:
submit flight plan information received by the plurality of input fields to a flight planning entity via the flight planning system; and
display, on the client device, information received from the flight planning entity in response to the submission.

* * * * *